(12) United States Patent
Lutz

(10) Patent No.: US 6,530,462 B2
(45) Date of Patent: Mar. 11, 2003

(54) FLUID CLUTCH

(75) Inventor: Manfred Lutz, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/803,553

(22) Filed: Mar. 9, 2001

(65) Prior Publication Data

US 2001/0027903 A1 Oct. 11, 2001

(30) Foreign Application Priority Data

Mar. 15, 2000 (DE) .......................... 100 12 648

(51) Int. Cl.[7] .............................................. F16D 31/00
(52) U.S. Cl. .................................... 192/58.61; 192/58.8
(58) Field of Search ............................ 192/126, 58.61, 192/58.6, 58.8, 85 T, 58.68; 123/41.12

(56) References Cited

U.S. PATENT DOCUMENTS

| | | | | |
|---|---|---|---|---|
| 3,749,217 A | * | 7/1973 | Bush et al. ............. | 192/113.34 |
| 4,458,798 A | * | 7/1984 | Bopp ...................... | 192/58.61 |
| 4,653,624 A | * | 3/1987 | Mader .................... | 192/58.681 |
| 4,828,088 A | * | 5/1989 | Mohan et al. ........... | 192/103 F |
| 4,874,072 A | * | 10/1989 | Mohan et al. ........... | 192/103 F |
| 4,893,703 A | * | 1/1990 | Kennedy et al. ........ | 123/41.12 |
| 5,030,865 A | * | 7/1991 | Rockey et al. .......... | 123/41.49 |
| 5,152,384 A | * | 10/1992 | Brown ................... | 192/110 B |
| 5,782,715 A | * | 7/1998 | Walton et al. ........... | 192/58.61 |
| 5,893,441 A | * | 4/1999 | Reeb ...................... | 192/58.43 |
| 6,056,098 A | * | 5/2000 | Brown et al. ........... | 192/58.61 |
| 6,125,981 A | * | 10/2000 | Ito et al. ................. | 192/58.61 |
| 6,247,567 B1 | * | 6/2001 | Watanabe ................ | 192/58.43 |

FOREIGN PATENT DOCUMENTS

| | | |
|---|---|---|
| DE | 89 08 357 | 12/1989 |
| DE | 89 08 359 | 12/1989 |

* cited by examiner

Primary Examiner—Jack Lavinder
Assistant Examiner—Benjamin A. Pezzlo
(74) Attorney, Agent, or Firm—Cohen, Pontani, Lieberman & Pavane

(57) ABSTRACT

A fluid clutch includes a first transmission element and a second transmission element which is rotatable about an axis of rotation with respect to the first transmission element. Torque transmission surfaces of the first and the second transmission elements are located opposite one another in a working fluid region in which torque transmission coupling can be made selectively between the first and the second transmission elements by means of fluid. A valve arrangement can be actuated for selectively making and breaking a fluid flow connection between a fluid storage region and the working fluid region, in order respectively to allow and prevent the ingress of fluid from the fluid storage region into the working fluid region and a braking apparatus can generate a braking force acting on the second transmission element. Two components are movable with respect to one another within a limited range of movement by the transmission of braking force to the second transmission element. As a result of relative movement between the two components, the valve arrangement is actuated for selectively making or breaking the fluid flow connection.

19 Claims, 3 Drawing Sheets

FLUID CLUTCH

BACKGROUND OF THE INVENTION

1. Field of the Invention

The present invention relates to a fluid clutch, comprising a first transmission element and a second transmission element which is rotatable about an axis of rotation with respect to the first transmission element. Torque transmission surfaces of the first and second transmission elements are located opposite one another in a working fluid region in which torque transmission coupling between the first and the second transmission elements can be made selectively by means of fluid. A valve arrangement can be actuated for selectively making and breaking a fluid flow connection between a fluid storage region and the working fluid region, in order respectively to allow and prevent the ingress of fluid from the fluid storage region into the working fluid region, and a braking apparatus can generate a braking force acting on the second transmission apparatus.

2. Description of the Related Art

DE-G 89 08 359 discloses a fluid clutch, in which a transmission element carrying a dynamic-pressure pump can be braked by activating a braking apparatus. Activating the braking apparatus raises the relative rotational speed between the two transmission arrangements, so that the efficiency of the dynamic-pressure pump increases and therefore fluid is drawn off from the working fluid region to an increased extent. A permanently open orifice allows a fluid stream from the fluid storage region to the working fluid region is located between the working fluid region and the fluid storage region. The dimension of this orifice must be such that, on the one hand, a sufficiently rapid ingress of fluid into the working fluid region is possible, but, on the other hand, during the activation of the braking apparatus, outflow of fluid which would empty the working fluid region is prevented.

DE-G 89 08 357 discloses a fluid clutch which, in addition to an electromagnetically acting braking apparatus, has a further electromagnetic apparatus which opens and closes a valve arrangement to complete and interrupt the flow path between the fluid storage region and the working fluid region. Two separately actuated apparatus have to be provided here, which takes up a relatively large amount of construction space and, moreover, raises the outlay involved in activation during the changeover of this fluid clutch between various operating states.

SUMMARY OF THE INVENTION

The object of the present invention is to provide a fluid clutch, which, while having a simple makeup, allows a rapid and defined transition between various operating states.

This object is achieved by means of a fluid clutch comprising a first transmission element and a second transmission element which is rotatable about an axis of rotation with respect to the first transmission element. Torque transmission surfaces of the first and second transmission elements are located opposite one another in a working fluid region in which torque transmission coupling between the first and the second transmission elements can be made selectively by means of fluid. A valve apparatus can be actuated for selectively making and breaking a fluid flow connection between a fluid storage region and the working fluid region, in order respectively to allow and prevent the ingress of fluid from the fluid storage region into the working fluid region, and a braking apparatus can generate a braking force acting on the second transmission element.

This fluid clutch is defined by two components movable with respect to one another within a limited range of movement as a result of the transmission of braking force to the second transmission element. The valve element can be actuated for selectively making and breaking the fluid flow connection by means of a relative movement between the two components.

In the fluid clutch according to the invention, therefore, the braking force transmitted to or exerted on the second transmission element is utilized directly for actuating the valve apparatus, so that two reactions are triggered solely as a result of the initiation or activation of the braking apparatus. On the one hand, the second transmission element is braked and, on the other hand, the valve apparatus is initiated in order to modify the fluid flow connection between the fluid storage region and the working fluid region. This makes it possible, along with a very simple makeup, to have a very simple initiating operation.

For example, the valve apparatus may be assigned at least one actuating element which can move to make and break the fluid flow connection, and the at least one actuating element may be set in motion by means of a relative movement between the two components.

In order to obtain a defined interaction between the braking apparatus, which is to brake the second transmission element, and the valve apparatus actuated as a result of this braking force, a pre-stressing arrangement pre-stressing the two components into a basic relative position can be provided. The two components can be deflected out of their basic relative position, counter to the pre-stressing action of the pre-stressing arrangement, by means of a braking force which is to be transmitted. In this case, the at least one actuating element can be moved in order to actuate the valve apparatus during the movement of the two components out of the basic relative position.

In order to further simplify the arrangement, the at least one actuating element can be held movably on one of the two components, an interaction region can be provided on the other of the two components, which region is assigned to the at least one actuating element and acts on the at least one actuating element during relative movement between the two components. In this case, two components are preferably rotatable about the axis of rotation with respect to one another, and the relative rotational movement between the two components can be converted into a movement of the at least one actuating element. In this case, actuation of the valve arrangement can be obtained in a simple way by holding the at least one actuating element on the one component so as to move essentially in the direction of the axis of rotation, and the interaction region assigned to the at least one actuating element comprises a cam surface region on the other component.

In general, in a fluid clutch of this type, a state in which the braking arrangement is not activated is a state in which this clutch can transmit a torque and therefore the two transmission elements can rotate at essentially the same rotational speed. In this state, however, care must be taken to ensure that sufficient fluid is present in the region between the two transmission elements to obtain a sufficient shear action. The valve apparatus should therefore provide a fluid flow connection during the positioning of the two components in the basic relative position, and when the two components are deflected out of the basic relative position, the valve apparatus should be capable of being actuated for at least partially breaking the fluid flow connection when the two components are deflected out of the basic relative position.

In a simple arrangement which still permits a defined initiation of the valve apparatus as a function of the state of actuation or state of activation of the braking apparatus, the valve apparatus has at least one valve element pre-stressed into an opening position. When the two components are deflected out of the basic relative position, the at least one valve element can be moved toward its closing position by an associated actuating element.

It is also advantageous, at the same time, if, as a result of the pre-stressing of the at least one valve element into its opening position, the associated actuating element is pre-stressed into an actuating opening position or into interacting contact with the interaction region assigned to the latter.

In order to provide a sufficiently high braking action without any frictional force being generated, the braking arrangement can have an essentially fixedly positioned or positionable first braking region, which has an electromagnet arrangement for generating the braking force, and a second braking region capable of being brought into magnetic interaction with the first braking region.

Integration of parts or of functions may be obtained by the second arrangement region forming at least part of one of the two components or being connected thereto. Preferably, the second transmission element includes a housing which surrounds the working fluid region and forms at least part of one of the two components or is connected thereto.

Preferably, to build up or provide fluid circulation in the fluid clutch according to the invention, a pump arrangement, preferably a dynamic-pressure pump arrangement, is also provided, by means of which fluid can be conveyed out of the working fluid region into the fluid storage region.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
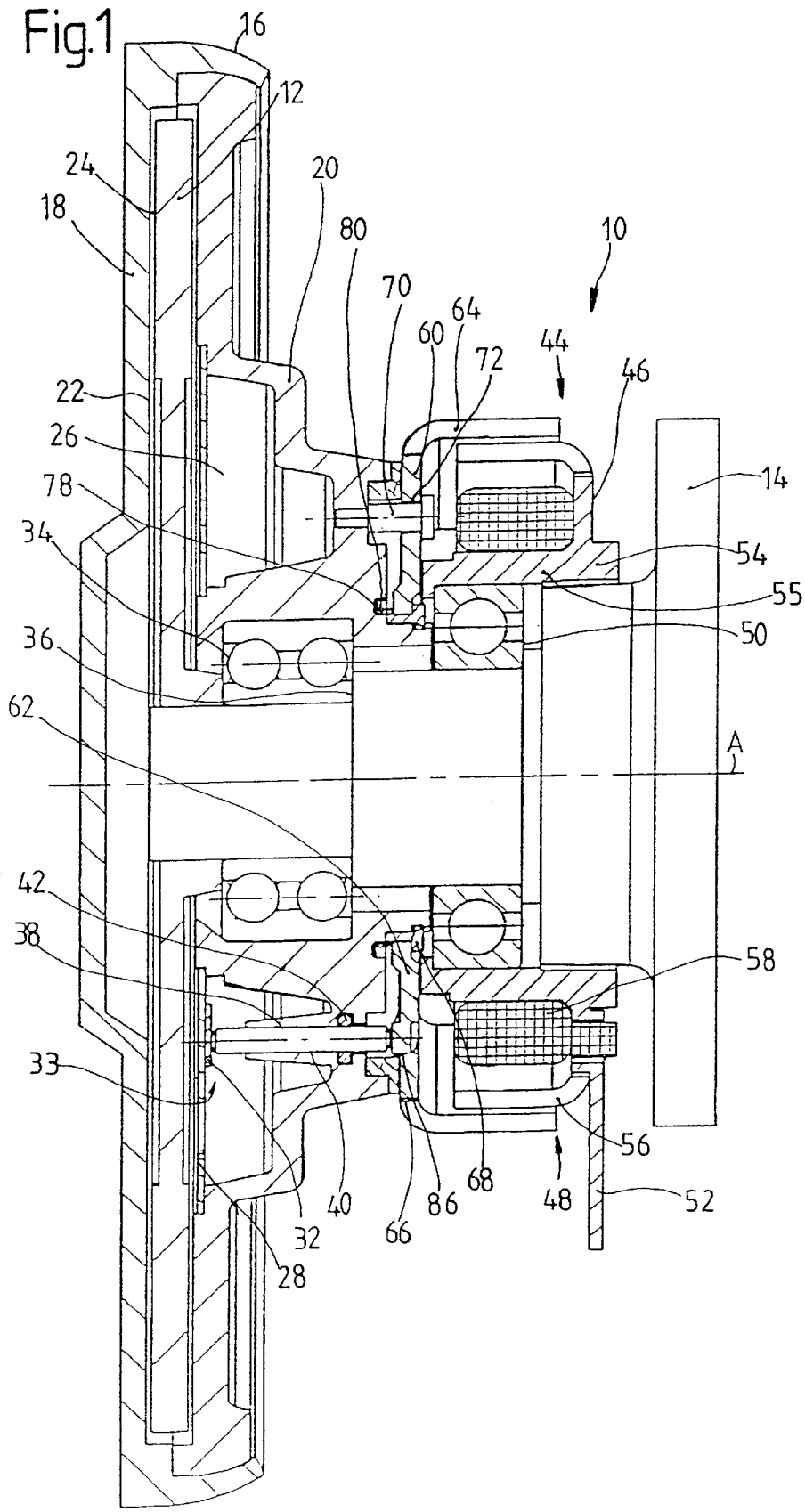
FIG. 1 is an axial section view of a fluid clutch according to the invention.
Figure 3:
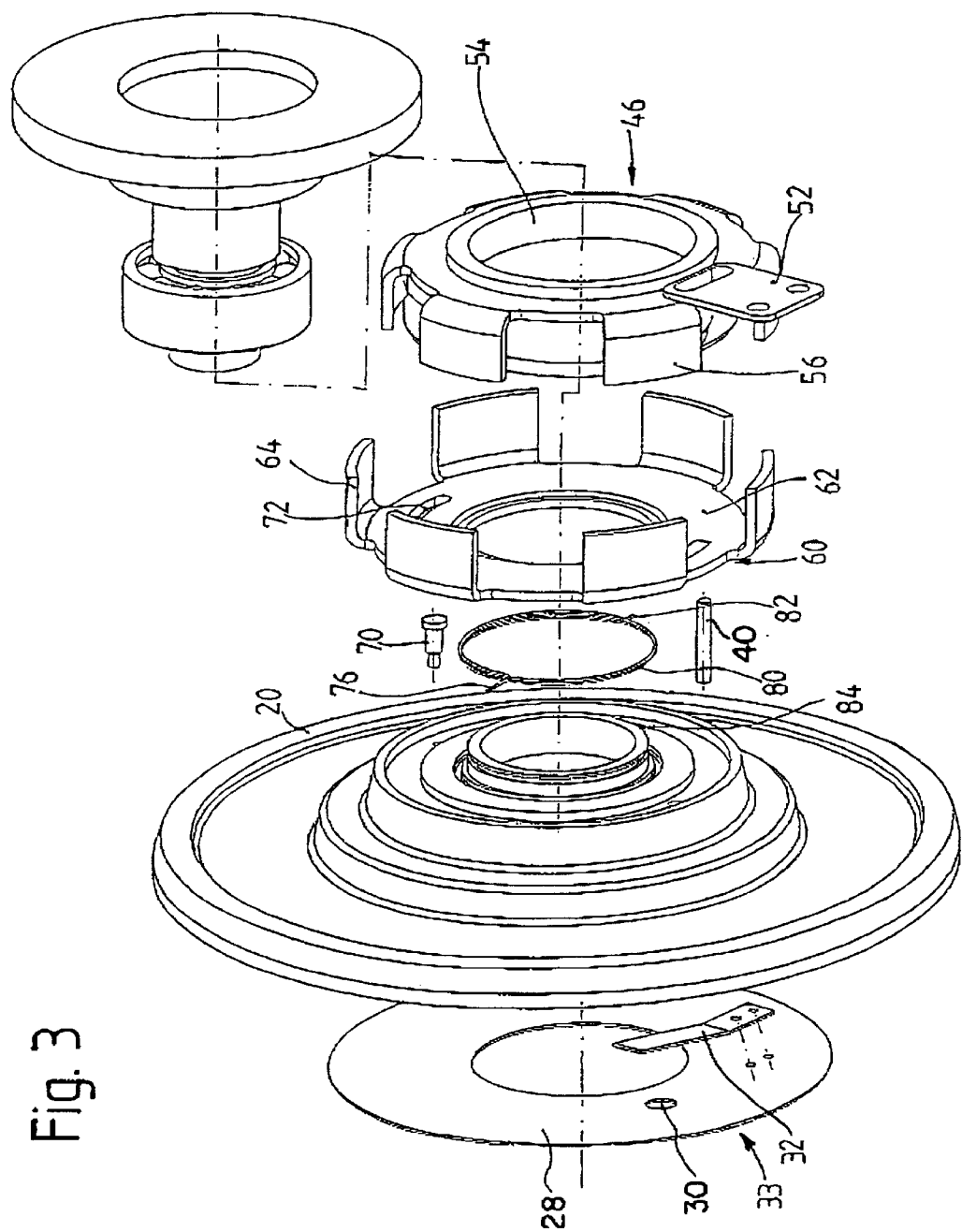
FIG. 3 shows an exploded view of the braking actuation used in the fluid clutch according to the invention and of those components which contribute to initiating a valve arrangement during the transmission of braking force.

Referring to FIG. 1, the fluid clutch 10 includes a disk-like rotor 12 which is connected in a rotationally fixed manner in its central region to a drive shaft 14, for example a crankshaft. The rotor 12 is surrounded by a housing 16 which essentially includes a cover 18 and a housing carrier 20. The cover 18 and housing carrier 20 are firmly connected to one another in the radially outer region and between them enclose a working space 22, in which the rotor 12 also extends. As also described below, this working space 22 may be filled with fluid, so that, in the gap region or interspace region 24 formed between the rotor 12 and the housing 16, surface regions of the rotor 12, which forms a first transmission element, and of the housing, which forms a second transmission element, are located opposite one another, the fluid being interposed, and a torque can thus be transmitted between these two subassemblies by shear action. Furthermore, a fluid storage region 26 is provided in the housing carrier 20 of housing 16, which region 26 is closed off relative to the working space 22 by a closing plate 28 of sheet-metal material or the like. A valve orifice 30, which can be seen in FIG. 3, is provided in this closing plate 28. This valve orifice 30 can be closed by means of a valve element 32. This valve element 32 is formed, for example, by a sheet-metal strip which can be firmly riveted or firmly welded to the closing plate 28 and, in principle, is pre-stressed into a position releasing the orifice 30, that is to say is bent away from the closing plate 28. As a result of action on this valve element 32, the latter can be moved toward the closing plate 28 and thus close the valve orifice 30.

The housing 16 is mounted rotatably on the shaft 14, with a bearing 34, for example a rolling-body bearing, being interposed. In this case, this bearing 34 can be held axially in the axial direction between a shoulder-like step 36 of the shaft 14 and the rotor 12 secured to the shaft 14.

A pin-like or tappet-like actuating element 40 is received in the housing carrier 20 in a guide orifice 38 extending essentially in the direction of an axis of rotation A. This actuating element 40 is displaceable in the direction of the axis of rotation A, and, in order to prevent an escape of fluid from the fluid storage region 26, a sealing element 42 surrounding the actuating element 40 is provided. A pump, for example a dynamic-pressure pump (not illustrated), is provided in the radially outer region of the housing 16. During relative rotation between the rotor 12 and the housing 16, the pumps draws off fluid from the working space 22 in the radially outer region and conveys it radially inward into the fluid storage region 26 via a line system which is not illustrated.

The fluid clutch 10 includes braking apparatus 44 having a first braking region 46 and a second braking region 48. The first braking region 46 is mounted on the driveshaft 14 via a further bearing 50, for example, a rolling-body bearing, but is secured against rotation, for example, by means of a detaining element 52, on an engine block or the like. That is to say, the first braking region 46 does not rotate with the shaft 14. The first braking region 46 comprises a so-called claw-pole wheel 55 which, starting from a ring-like body region 54, has a plurality of claws 56 extending slightly radially outward and then essentially axially, and a magnetic coil 58 isolated in the space between the claws 56 and the body region 54. The magnet coil 58 can be supplied with current via electrical lines, not illustrated, and can thus be excited in order to generate a magnetic field.

The second braking region 48 comprises a so-called claw-pole basket 60 with a body region 62 designed essentially in a form of an annular disk with claws 64 extending radially outward and then axially. A bearing ring 66, for example a sliding-bearing ring, is located between the claw-pole basket 60 and the housing carrier 20. This bearing ring 66 ensures that the claw-pole basket 60 is rotatable about the axis of rotation A with respect to the housing carrier 20, and further ensures axial support. A further bearing ring 68, which is located in the radially inner region between the body 62 resembling an annular disk and the housing carrier 20, ensures radial support.

A pin-like blocking element 70 extending essentially axially is secured to the housing carrier 20, for example by being screwed in. This pin-like element 70 passes through an arucate slot 72 provided in the claw-pole basket 60 and extending in the circumferential direction, so that the claw-pole basket 60 is rotatable about the axis of rotation A within a limited rotary angle range with respect to the housing carrier 20 and therefore with respect to the housing 16. As can also be seen in FIG. 2, a fastening projection 74 is provided on the annular disk-shaped body region 62 of the claw-pole basket 60. A first leg 76 of a leg spring 80 received in a receiving groove 78 of the housing carrier 20 can be supported on projection 74 in the circumferential direction. The second leg 82 of this leg spring 80 can engage into a recess 84 provided for this purpose in the housing carrier 20. By means of this leg spring 80, which ultimately forms a pre-stressing arrangement for the claw-pole basket 60, the claw-pole basket 60 is pre-stressed into a basic relative rotary position with respect to the housing carrier 20, in which position a circumferential end wall of the slot 72 butts on the pin 74.

A ramp 86 is formed, for example by being pressed out, in an interaction region of the claw-pole basket 60 which is located opposite the actuating element 40. This ramp 86, which ultimately forms an actuating cam for the actuating element 40, is positioned in such a way that, during the positioning of the claw-pole basket 60 in the basic relative rotary position, by the leg spring 80, the low end region 88 of ramp 86 is aligned axially with the actuating element 40. As a result of the already mentioned pre-stressing of the valve element 32 into its opening position, in which the latter is lifted off from the valve orifice 30, the actuating element 40 is pushed to the right toward the claw-pole basket 60 in the axial direction in FIG. 1, for example to an extent such that the actuating element 40 bears on the lower end 88. When the claw-pole basket 60 is rotated out of the basic relative rotary position with respect to the housing carrier 20 in the way described below, the ramp 86 moves with its ascending ramp surface 90 along the actuating element 40, until, during the maximum relative rotation of the claw-pole basket 60 with respect to the housing carrier 20, this actuating element 40 is ultimately located opposite the high end 92 of ramp 86. In this case, however, the actuating element 40 is displaced axially by ramp 86, so that, in its other end region, the valve element 32 is moved toward the closing plate 28 and the valve orifice 30 is successively closed. In this state, fluid flow from the fluid storage region 26 to the working space 22 is prevented.

Figure 2:
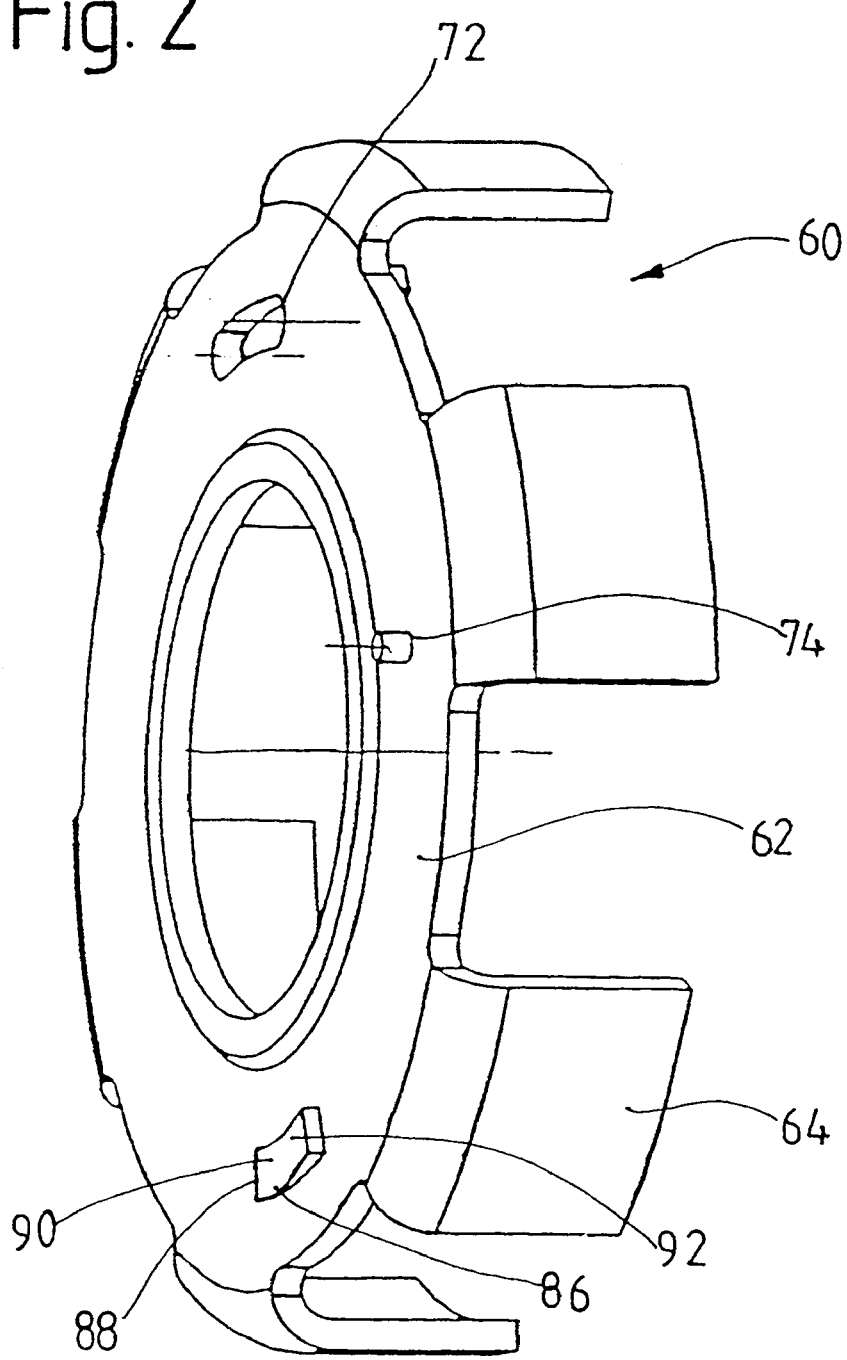
FIG. 2 is a perspective view of a claw-pole basket which is used in a braking apparatus of the fluid clutch according to the invention.

The functioning of the fluid clutch 10 illustrated in FIGS. 1 to 3 is described below. It will be assumed, in the first place, that this fluid clutch 10 is or is to be in a state in which it is to transmit the highest possible torque from the drive-shaft 14 to the housing 16, that is to say the second transmission element, forming an output region of the fluid clutch 10. In this state, the magnet coil 58 of the braking apparatus is not excited, so that ultimately no magnetic interaction is generated between the claw-pole wheel 55 and the claw-pole basket 60. The claw-pole basket 60 is then rotated into its already mentioned basic relative rotary position with respect to the housing carrier 20, so that the valve arrangement 33 comprising the valve element 32 and the valve orifice 30 is also essentially positioned in its opening position. Fluid contained in the fluid storage region 26 can then flow, essentially unimpeded, beyond the valve orifice 30 into the working space 22, so that it can contribute to torque transmission there by fluid shear action essentially in the entire region of the space of the working space 22. Since the rotor 12 and the housing arrangement 16 rotate essentially at the same rotational speed as a result of the relatively high transmitted torque, the efficiency of the dynamic-pressure pump positioned in the radially outer region is very low, so that virtually no fluid is drawn off from the working space 22.

The small fraction of fluid nevertheless conveyed out of the working space 22 and into the fluid storage region 26, possibly due to minimal slip, can be compensated again via the orifice 30.

If the transmitted torque is to be reduced, the rotational speed of the housing 16 is reduced with respect to the rotational speed of the rotor 12 by appropriate excitation of the magnet coil 58. Since the claw-pole wheel 55 and claw-pole basket 60 are elements which physically bear directly on one another, in each case the magnetic poles of different polarity are formed in the region of the claws 56, 64. In this way, however, a force is generated between the claw-pole wheel and the claw-pole basket 60 and ultimately attempts to move the claws 60 as near as possible to the claws 56. In the case of an equal number of claws, this would ultimately be a positioning in which a claw 64 is in each case located radially directly opposite a claw 56. As a result of this magnetic interaction between the claw-pole wheel 55 and the claw-pole basket 60, therefore, the claw-pole basket 60 is braked. This braking force or this braking torque is transmitted via the leg spring 80 to the housing carrier 20. However, since the latter is initially also rotated together with the rotor 12 by virtue of the existing fluid shear action, the leg spring 80 located in the braking force transmission path between the braking apparatus 44 and the housing apparatus 16 is tensioned. That is to say, due to the reaction torque building up in the region of the housing 16, the claw-pole basket 60 is then rotated, starting from the basic relative rotary position, in the circumferential direction with respect to the housing carrier 20 counter to the pre-stressing force of the leg spring 80. This rotation, which is induced by the braking force transmitted to the housing 16, then leads to the actuating element 40 being displaced axially by the ramp 86 and the valve 33 thereby being closed. That is to say, because of the braking force which initially leads to relative rotation between the claw-pole basket 60 and housing carrier 20 as components lying in the braking force flux, the valve arrangement 33 is also actuated in the closing direction. The after-flow of fluid out of the fluid storage region 26 into the working space 22 is then essentially prevented. On account of the increase in difference in rotational speed between the rotor 12 and the housing arrangement 16, the efficiency of the dynamic-pressure pump also increases, so that the working fluid present in the interspace region 24 is increasingly drawn off in the radially outer region, but fluid essentially no longer flows after radially on the inside. Consequently, the torque transmitted between the rotor 12 and the housing 16 also decreases, until a minimum value of the transmitted torque is ultimately reached. The torque will not fall to 0, since there will always be a minimal residual quantity of fluid which contributes to the transmission of torque between the rotor 12 and the housing 16, particularly in the radially outer region. This cannot be drawn off by the dynamic-pressure pump, for example because the latter is not positioned entirely radially on the outside. This residual torque ensures that, even with the valve arrangement 33 closed, the housing arrangement 16 is provided with a reaction force which ensures that the leg spring 80 cannot relax again. The result of relaxation of the leg spring 80 would be that, in the absence of reaction force, the claw-pole basket 60 would be rotated again into its basic relative rotary position with respect to the housing arrangement 16 and at the same time the valve arrangement 30 would assume its opening position again. If current continued to be applied to the magnet coil 58, this would result in an oscillating behavior. However, since there is always a minimal reaction force, the leg spring 80 remains tensioned, with the magnet coil 58 excited. That is to say, the valve 33 remains closed and the torque transmitted between the rotor 12 and the housing 16 remains minimal.

In the fluid clutch according to the invention, therefore, what is achieved by the initiation of a single sub-assembly, to be precise the magnet coil 58 of the braking arrangement 44, is that, on the one hand, a braking force is transmitted to the second transmission arrangement, i.e., to housing 16, and that, on the other hand, the valve 33 is closed in order to break the fluid flow connection between the fluid storage region 26 and the working space 22. Since this actuation of the valve 33 is induced by the braking torque transmitted to the housing 16, no electromagnetic force, which would have to be drawn off from the braking apparatus 44, is required in order to obtain this actuation of the valve 33. The braking force of the braking apparatus 44 must, in any event, be transmitted from the claw-pole basket 60 to the housing 16, so that the relative movement induced by the generation of braking force between the claw-pole basket 60 and the housing 16 makes it possible in a simple way to close the valve 33, without additional energy having to be drawn off for this purpose from the region of the braking apparatus 44.

As already described above, the claw-pole wheel 55 and the claw-pole basket 60 may be designed in such a way that they have the same number of claws and therefore the same number of magnetic poles. It would, however, be conceivable to provide unequal numbers of poles, so that a smoother transition into the braking state becomes possible. Moreover, the valve arrangement 33 may have a plurality of such actuating elements or valve orifices, in which case each valve-actuating element would appropriately have to be assigned a corresponding ramp surface on the claw-pole basket 60.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:
1. A fluid clutch, comprising:
   a first transmission element having a torque transmission surface;
   a second transmission element, which is rotatable about an axis of rotation with respect to the first transmission element, said second transmission element having a torque transmission surface;
   a working fluid region wherein the torque transmission surfaces of the first and second transmission elements are located opposite one another and in which torque transmission can be selectively coupled between the first and the second transmission elements by means of fluid arranged between the torque transmission surfaces;
   a fluid storage region for the reception of fluid;
   a valve arrangement, which can be actuated for selectively making and breaking a fluid flow connection between the fluid storage region and the working fluid region, in order respectively to allow and prevent the ingress of fluid from the fluid storage region into the working fluid region;
   braking apparatus comprising an essentially fixed position first braking region having an electromagnet arrangement for generating a braking force acting on the second transmission element and a second braking region which can magnetically interact with the first braking region, said braking force being achieved exclusively by said magnetic interaction;
   two components which move with respect to one another within a limited range of movement in response to said braking force acting on the second transmission element, and
   means for actuating said valve arrangement in response to relative movement between said two components.

2. The fluid clutch as claimed in claim 1 further comprising an actuating element which moves in response to relative movement between the two components, which activating element acts directly on said valve arrangement to make and break said fluid flow connection.

3. The fluid clutch as claimed in claim 1 further comprising a pre-stressing arrangement which pre-stresses the two components into a basic relative position, the two components being movable out of their basic relative position, counter to the pre-stressing action of the pre-stressing arrangement, in response to said braking force acting on the second transmission element.

4. The fluid clutch as claimed in claim 3, further comprising an actuating element which moves in response to relative movement between the two components which actuating element actuates the valve arrangement during the movement of the two components out of the basic relative position.

5. The fluid clutch as claimed in claim 2, wherein the actuating element is held movably on one of the two components, said clutch further comprising an interaction region on the other of the two components, said interaction region interacting with the at least one actuating element to cause the at least one actuating element to move during relative movement between the two components.

6. The fluid clutch as claimed in claim 2, wherein the two components are rotatable about the axis of rotation with respect to one another, and wherein the relative rotational movement between the two components is converted into movement of the actuating element.

7. The fluid clutch as claimed in claim 5, wherein the two components are rotatable about the axis of rotation with respect to one another, said actuating element being held on the one component in the direction of the axis of rotation, the interaction region comprising a cam surface on the other component.

8. The fluid clutch as claimed in claim 3, wherein the valve arrangement provides a fluid flow connection when the two components are in the basic relative position, and wherein the valve arrangement at least partially breaks the a fluid flow connection when the two components are deflected out of the basic relative position.

9. The fluid clutch as claimed in claim 8, further comprising an actuating element which moves in response to relative movement between the two components, the valve arrangement comprising a valve element pre-stressed into an open position, and wherein, when the two components are deflected out of the basic relative position, the valve element is moved in the direction of its closed position by the actuating element.

10. The fluid clutch as claimed in claim 9, wherein the actuating element is pre-stressed into an actuating opening position as a result of the pre-stressing of the valve element into its open position.

11. The fluid clutch as claimed in claim 5, wherein said valve arrangement comprises a valve element which is pre-stressed into an open position, said actuating element acting directly on said valve element and being pre-stressed into contact with said interaction region by said valve element.

12. The fluid clutch as claimed in claim 1, wherein the second braking region forms at least part of one of the two components.

13. The fluid clutch as claimed in claim 1, wherein the second transmission element comprises a housing surrounding the working fluid region, the housing forming at least part of one of the two components.

14. The fluid clutch as claimed in claim 1 further comprising a dynamic-pressure pump arranged to convey fluid out of the working fluid region into the fluid storage region.

15. The fluid clutch as claimed in claim 1 wherein one of said components comprises said second transmission element and the other of said components comprises said second braking region.

16. The fluid clutch as claims in claim 1 wherein said first braking region further comprises a claw pole wheel and said second braking region comprises a claw pole basket.

17. The fluid clutch as claimed in claim 16 wherein said claw pole wheel and said claw pole basket each comprise a plurality of claws, said claws of said basket being urged into radial alignment with said claws of said wheel when said electromagnet arrangement is actuated.

18. A fluid clutch as in claim 5 wherein said two components move rotationally with respect to each other, said interaction region comprising a ramp which causes said actuating element to move axially during relative rotational movement of the two components.

19. A fluid clutch as in claim 18 wherein said valve arrangement comprises a valve element and an orifice, said valve element being movable against said orifice when said actuating element is moved axially.

* * * * *